Oct. 29, 1957  M. R. PORATH  2,811,005
STALK GUIDING MEANS FOR CORN HARVESTER
Filed April 10, 1956  2 Sheets-Sheet 1
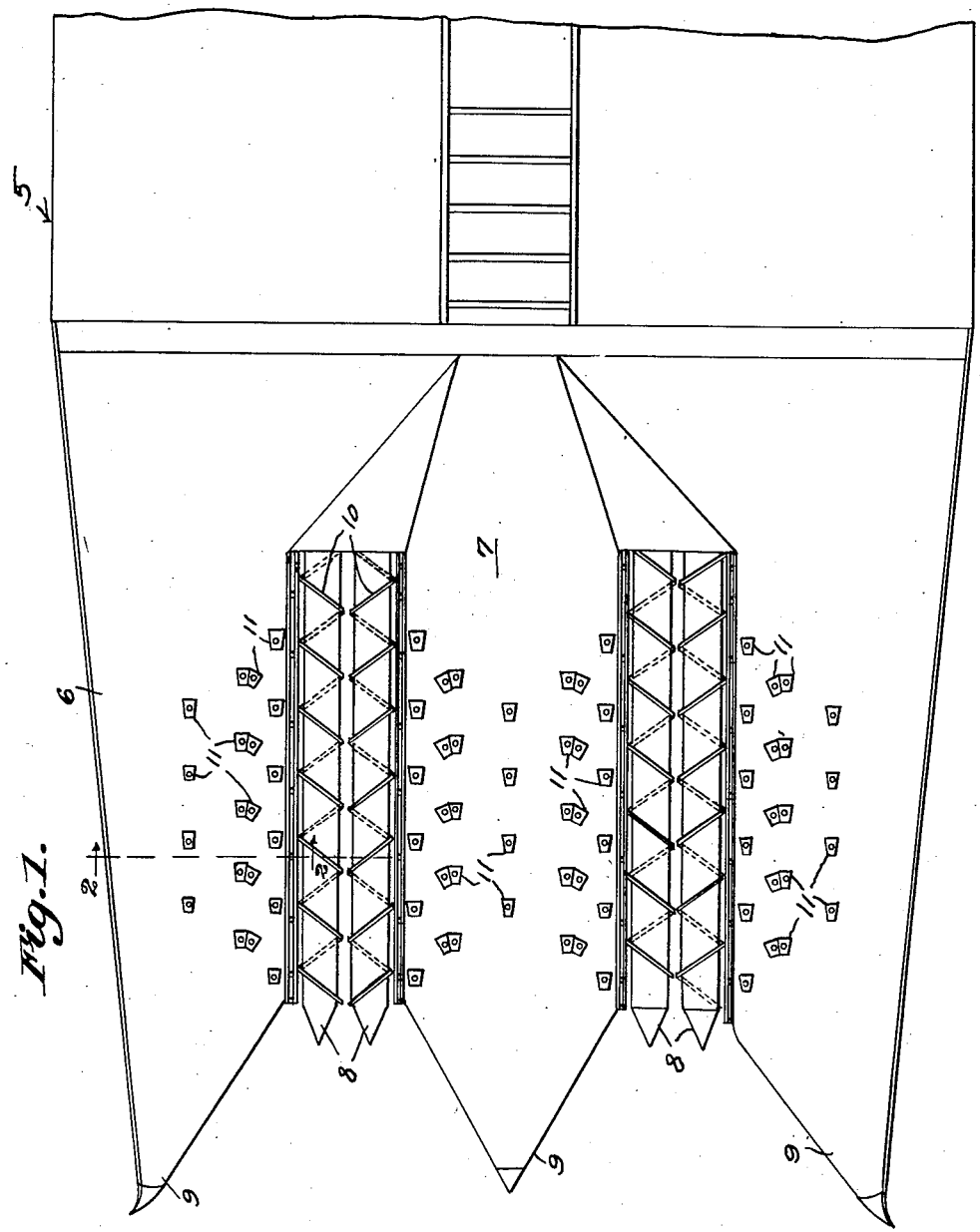
Merritt R. Porath
INVENTOR Oct. 29, 1957 M. R. PORATH 2,811,005
STALK GUIDING MEANS FOR CORN HARVESTER
Filed April 10, 1956 2 Sheets-Sheet 2
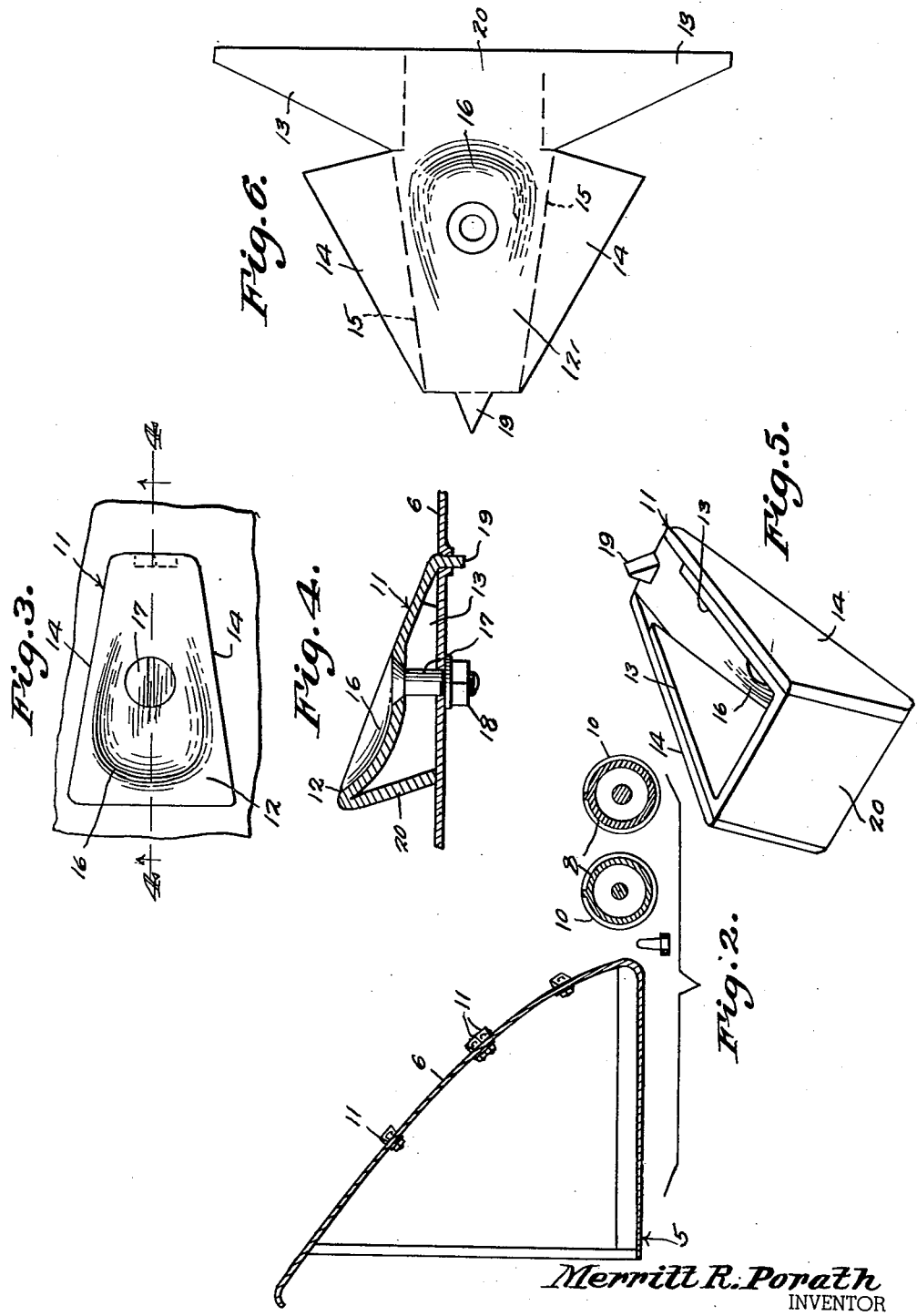
Merritt R. Porath
INVENTOR
BY CA Snow &Co.
ATTORNEYS.

United States Patent Office 2,811,005
Patented Oct. 29, 1957

2,811,005

STALK GUIDING MEANS FOR CORN HARVESTER

Merritt R. Porath, Pocahontas, Iowa

Application April 10, 1956, Serial No. 577,269

2 Claims. (Cl. 56—119)

This invention relates to agricultural machines, and more particularly to corn picking machines wherein rotary picking cylinders are mounted between picker frames to pick up the material being harvested and carry corn or material rearwardly to an endless carrier operating within the machine frame, to convey the material to a place of deposit.

An important object of the invention is to provide stops in the form of lugs extending from the picking cylinder shields, the machine being arranged to hold corn stalks and material cut by the machine, against slipping off of the machine, thereby preventing waste of material which ordinarily and under known conditions, falls to the ground surface and is not recovered by the machine during the normal operation of the machine.

Another important object of the invention is to provide lugs of this character which may be readily and easily mounted on the frames of the rotary picker cylinders, which frames form shields or guards for the rotary picker cylinders.

With the foregoing and other objects in view, which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a fragmental plan view of a corn picker equipped with lugs constructed in accordance with the invention.

Figure 2 is a sectional view taken on line 2—2 of Figure 1.

Figure 3 is an enlarged fragmental plan view illustrating a lug constructed in accordance with the invention.

Figure 4 is a sectional view taken on line 4—4 of Figure 3.

Figure 5 is a perspective view of one of the lugs taken from the bottom.

Figure 6 is a view illustrating the formation of a blank from which a lug is constructed.

Referring to the drawings in detail, the reference character 5 refers generally to a picking machine of the row type which, generally speaking, is conventional in construction and embodies side shields 6 and a central shield 7.

As better shown by Figure 1 of the drawings, the adjacent side edges of the shields 6 and 7 are spaced apart providing clearances for the cylinders 8 that are arranged in pairs at opposite sides of the machine.

The shields 6 and 7 are provided with pointed forward ends indicated by the reference character 9, which pointed ends provide means whereby the machine in passing through standing rows of vegetation, will move into contact therewith, to hold the stalks of the material, which may be corn, in an upright position so that it may be readily cut by the machine as its passes along the rows.

These cylinders 8 are provided with longitudinally extending spiral ribs 10, which are so arranged that the ribs of adjacent cylinders cooperate in feeding the material rearwardly of the cylinders to be cut by the machine.

The stops or lugs constituting the subject matter of the present invention, are indicated by the reference character 11. These stops or lugs are secured to the upper curved surfaces of the side and central shields 6 and 7.

Each of these lugs is formed of a length of heavy sheet metal material formed into a blank providing a main portion 12, lateral end flanges 13, and elongated side flanges 14. In the formation of the stops or lugs, the lateral flanges 13 are bent towards each other, where they lie in parallel relation with each other at one side of the main portion 12. The elongated side flanges are now bent inwardly along the lines 15, and because the outer edges of the elongated side flanges 14 are disposed at oblique angles with respect to the ends of the main portions of the lugs, the flanges 13 and 14 when folded as described, will provide lugs which have wide ends and narrow forward ends.

The main portion 12 of each lug is formed with a depression 16 formed with an opening to receive a securing screw 17 that also passes through an opening formed in the shield to which it is attached, where the screw is provided with a nut 18, which secures the screw in position and acts to hold the major portion of the stop or lug in position.

At the forward end of each stop or lug is a pointed extension 19 that fits into an opening formed in the shields to better hold the lugs in place.

It will also be noted that the rear ends 20 of the lugs, which are extended laterally, contact and rest on the shield with which the lugs are used, as shown by Figure 4 of the drawings.

From an observation of Figure 1 of the drawings, it will be obvious that these stops or lugs 11 are arranged in rows on the shields and are disposed with such respect to the cylinders 8 that material picked up by the cylinders 8 as the machine is moved through a row of growing crops, will be directed laterally onto the shields, wherein they will fall against the wide ends of the stops where they will be held against sliding forwardly or laterally from the shields. Since the material will not fall away from the shields, it is obvious that the material may be readily picked up and carried rearwardly through the machine in the usual way.

It will also be seen that due to the arrangement of the stops or lugs, the stalks or stems of the material being harvested will be prevented from moving away from the moving parts of the machine, thus enabling the machine to be fed more evenly with the resultant better moving action and less displacement of the material being harvested.

It might be further stated that these stops or lugs are so constructed that they may be readily applied to the usual harvesting machine of the type disclosed, by merely forming openings in the shields thereof to properly locate the stops or lugs.

Having thus described the invention:
What is claimed is:

1. The combination with a harvesting machine having laterally spaced shields between which horizontally disposed rotatable feed cylinders operate, said shields having bolt openings and lug openings disposed adjacent thereto, of lugs arranged on the surfaces of said shields for preventing movement of material therethrough in one direction, each lug comprising a body including a length of sheet metal material, flanges formed along the side edges of said body extending laterally at right angles, said flanges having inclined edges resting on said shield holding the main portion of said body inclined and spaced above said shield, said body having a bolt opening registering with a bolt opening of said shield, a pointed extension extending laterally from one end of said body adapted to be positioned in a lug opening of said shield, securing said lug against lateral movement, and a bolt extending through said registering bolt openings of said lug and shield, securing said lug in position on said shield.

2. The combination with a harvesting machine having laterally spaced shields between which horizontally disposed rotatable feed cylinders operate, said shields having bolt openings and adjacent lug openings, of lugs arranged on the surfaces of said shields for preventing movement of material therethrough in one direction, each lug comprising a body including a length of sheet metal material, flanges formed along the side edges of said body extending laterally at right angles, said flanges having inclined edges resting on said shield holding the main portion of said body inclined and spaced above said shield, said body having a bolt opening adapted to register with a bolt opening of said shield, a pointed extension extending laterally from one end of said body adapted to be positioned in a lug opening of said shield securing said stop against lateral movement, a bolt extending through said registering bolt openings of said lug and shield, securing said lug in position, and the other end of said length of sheet metal opposite to said pointed extension, being extended laterally in contact with the shield holding said lug in inclined position.

References Cited in the file of this patent

UNITED STATES PATENTS 1,978,968     Steel _____ Oct. 30, 1934